United States Patent
Ding et al.

(10) Patent No.: US 9,471,066 B2
(45) Date of Patent: Oct. 18, 2016

(54) SYSTEM FOR AND METHOD OF PROVIDING PRESSURE INSENSITIVE SELF VERIFYING MASS FLOW CONTROLLER

(71) Applicants: Junhua Ding, Boxborough, MA (US); Michael L'Bassi, Sterling, MA (US)

(72) Inventors: Junhua Ding, Boxborough, MA (US); Michael L'Bassi, Sterling, MA (US)

(73) Assignee: MKS Instruments, Inc., Andover, MA (US)

(*) Notice: Subject to any disclaimer, the term of this patent is extended or adjusted under 35 U.S.C. 154(b) by 271 days.

(21) Appl. No.: 14/180,063

(22) Filed: Feb. 13, 2014

(65) Prior Publication Data
US 2014/0158211 A1    Jun. 12, 2014

Related U.S. Application Data

(63) Continuation-in-part of application No. 13/354,988, filed on Jan. 20, 2012.

(51) Int. Cl.
*G05D 7/06* (2006.01)
*G01F 25/00* (2006.01)
(Continued)

(52) U.S. Cl.
CPC ............ *G05D 7/0635* (2013.01); *G01F 1/86* (2013.01); *G01F 15/003* (2013.01); *G01F 15/005* (2013.01); *G01F 25/003* (2013.01); *Y10T 137/0368* (2015.04); *Y10T 137/7759* (2015.04)

(58) Field of Classification Search
CPC . G05D 7/0635; G01F 15/002; G01F 25/003; Y10T 137/776
USPC ........................ 137/487.5, 487, 551; 73/196
See application file for complete search history.

(56) References Cited

U.S. PATENT DOCUMENTS 3,952,759 A    4/1976 Ottenstein
4,487,213 A   12/1984 Gates et al.
(Continued)

FOREIGN PATENT DOCUMENTS

CN    1513110    7/2004
CN  101208641    6/2008
(Continued)

OTHER PUBLICATIONS

Brooks Instrument, Installation and Operation Manual, X-TMF-GF100-Series-MFC-eng, Part No. 541B137AAG, 82 pages (2013).
(Continued)

*Primary Examiner* — Craig Schneider
*Assistant Examiner* — Nicole Wentlandt
(74) *Attorney, Agent, or Firm* — McDermott Will & Emery LLP

(57) ABSTRACT

A mass flow controller comprises: a pressure-based flow meter, a thermal-based flow meter, a control valve, and a system controller. The pressure-based flow meter and thermal-based flow meter each measure flow rate of mass through the mass flow controller. The control valve controls the flow rate in response to a control signal generated as a function of the flow rate as measured by thermal-based flow meter when the measured flow rate is relatively low, and as a function of the flow rate as measured by the pressure-based flow meter when the flow rate is relatively high. A comparison of the flow measurements of the two flow meters can be used to (a) sense pressure disturbances at low flow rates, and (b) sense when the thermal-based flow meter is out of calibration so that a zero offset signal can be applied to the thermal-based flow meter.

19 Claims, 4 Drawing Sheets

(51) Int. Cl.
*G01F 1/86* (2006.01)
*G01F 15/00* (2006.01)

(56) References Cited

U.S. PATENT DOCUMENTS

| | | |
|---|---|---|
| 6,394,120 B1 | 5/2002 | Wichert |
| 6,439,253 B1 | 8/2002 | Easton |
| 7,204,158 B2 | 4/2007 | Morgan et al. |
| 7,636,640 B2 | 12/2009 | Wang et al. |
| 7,654,151 B2 | 2/2010 | Agar et al. |
| 7,658,204 B2 | 2/2010 | Ishida |
| 7,823,436 B2 | 11/2010 | Monkowski et al. |
| 8,109,289 B2 | 2/2012 | Trnka et al. |
| 8,240,324 B2 | 8/2012 | Monkowski et al. |
| 8,265,888 B2 | 9/2012 | Chung et al. |
| 8,271,210 B2 | 9/2012 | Chung et al. |
| 8,271,211 B2 | 9/2012 | Chung et al. |
| 8,356,623 B2 | 1/2013 | Isobe et al. |
| 8,504,318 B2 | 8/2013 | Mendelson et al. |
| 8,751,180 B2 | 6/2014 | Lull et al. |
| 2002/0083984 A1 | 7/2002 | Easton |
| 2003/0039550 A1 | 2/2003 | Wichert |
| 2006/0278276 A1 | 12/2006 | Tanaka et al. |
| 2006/0283254 A1 | 12/2006 | Ding et al. |
| 2007/0113641 A1 | 5/2007 | Ding et al. |
| 2009/0112504 A1 | 4/2009 | Ding et al. |
| 2009/0183548 A1 | 7/2009 | Monkowski et al. |
| 2009/0183549 A1 | 7/2009 | Monkowski et al. |
| 2009/0212847 A1 | 8/2009 | Schultz et al. |
| 2009/0266139 A1 | 10/2009 | Gregor et al. |
| 2010/0080262 A1 | 4/2010 | McDonald |
| 2010/0125424 A1 | 5/2010 | Ding et al. |
| 2010/0209859 A1 | 8/2010 | Inoue et al. |
| 2011/0022334 A1 | 1/2011 | Ding et al. |
| 2011/0108126 A1 | 5/2011 | Monkowski et al. |
| 2011/0139271 A1 | 6/2011 | Hirata et al. |
| 2011/0284500 A1 | 11/2011 | Rappl et al. |
| 2012/0132291 A1 | 5/2012 | Monkowski et al. |
| 2012/0216888 A1 | 8/2012 | Ding et al. |
| 2012/0304781 A1 | 12/2012 | Monkowski et al. |
| 2013/0186486 A1 | 7/2013 | Ding |

FOREIGN PATENT DOCUMENTS

| | | |
|---|---|---|
| CN | 101238357 | 8/2008 |
| CN | 101796378 | 8/2010 |
| CN | 102057340 B | 5/2011 |
| CN | 102124418 | 7/2011 |
| DE | 102009046758 A1 | 5/2011 |
| JP | H3166611 | 7/1991 |
| JP | H3211601 | 9/1991 |
| JP | H08312908 | 11/1996 |
| JP | 2004246826 | 9/2004 |
| JP | 2011530755 | 12/2011 |
| JP | 2003167630 | 6/2013 |
| TW | I223056 | 11/2004 |
| WO | WO2010018191 | 2/2010 |
| WO | WO2011047361 | 4/2011 |
| WO | 2013134141 A2 | 9/2013 |
| WO | WO2013134141 | 9/2013 |

OTHER PUBLICATIONS

Brooks Instrument, Data Sheet GF135 Digital Mass Flow Controller, 10 pages (2013).

International Search Report and the Written Opinion dated Feb. 11, 2014 from corresponding PCT Application No. PCT/US2013/057184.

International Search Report and the Written Opinion from corresponding PCT Application No. PCT/US2015/012851 dated Apr. 28, 2015.

International Search Report and the Written Opinion from corresponding PCT Application No. PCT/US2015/015831 dated May 22, 2015.

Non-Final Office Action dated Jun. 29, 2015 from corresponding U.S. Appl. No. 13/354,988.

Office Action dated Aug. 18, 2015 from corresponding Japanese Application No. 2014-553321.

Office Action dated Sep. 23, 2015 from corresponding Korean Patent Application No. 10-2014-7022413.

Office Action dated Oct. 2, 2015 from corresponding Taiwan Patent Application No. 104106156.

International Search Report and the Written Opinion dated Mar. 11, 2013 from Corresponding PCT Application No. PCT/US2013/020790.

SYSTEM FOR AND METHOD OF PROVIDING PRESSURE INSENSITIVE SELF VERIFYING MASS FLOW CONTROLLER

CROSS-REFERENCE TO RELATED APPLICATIONS

This application is a continuation-in-part application of U.S. Ser. No. 13/354,988 filed Jan. 20, 2012

BACKGROUND

1. Field

This disclosure relates generally to mass flow controllers (MFCs), and more particularly to a system for and method of monitoring flow through MFCs in real time. As used herein the term "gas" includes the term "vapor(s)" should the two terms be considered different.

2. Overview

Mass flow controllers (MFCs) are devices for measuring and controlling the flow of gases. They are usually used to control the flow of gases during a semiconductor manufacturing process wherein the flow of gases into a semiconductor tool, such as a vacuum chamber, must be carefully controlled in order to produce high yield semiconductor products. MFCs are usually designed and calibrated to control specific types of gas at particular ranges of flow rates. The devices control the rate of flow based on a given setpoint, usually predetermined by the user or an external device such as the semiconductor tool itself. MFCs can be either analog or digital. They are typically designed to be used with pressure ranges of the inlet gases, with low pressure and high pressure MFCs being available. All MFCs have an inlet port, outlet port, a mass flow meter including a mass flow sensor and a proportional control valve. A system controller is used as a part of a feedback control system that provides a control signal to the control valve as a function of a comparison of the flow rate as determined by the setpoint with the measured flow rate as sensed by the mass flow sensor. The feedback control system thus operates the valve so that the measured flow is maintained at the flow rate as determined by the setpoint.

Such control systems assume that the MFC remains in calibration within certain tolerances. In order to test whether flow rates of a MFC are within the tolerances of calibration, the MFC is typically tested off line with such devices as mass flow verifiers. While off line testing is very accurate, there is always a problem that a MFC can become out of calibration during the running of a process (in real time), and not be detected until the process is completed. Often this can result in lower yields of semiconductor product, and even a complete failure resulting in the loss of the entire product yield. This can be expensive, and is clearly undesirable. What is needed is a device and method for continually testing the calibration settings of a MFC in real time while processes are being run.

DESCRIPTION OF RELATED ART

Reference is made to Japanese Published Application 2004-246826A2004.9.2

SUMMARY

A mass flow controller comprises: a pressure-based flow meter, a thermal-based flow meter, a control valve, and a system controller. The pressure-based flow meter is constructed and arranged to measure the flow rate of mass through the mass flow controller. The thermal-based flow meter is constructed and arranged to measure flow rate of mass through the mass flow controller. The control valve is constructed and arranged so as to control the flow rate of mass through the mass flow controller in response to a control signal generated as a function of the flow rate as measured by one of the flow meters. And the system controller is constructed and arranged to generate the control signal as a function of the flow rate as measured by thermal-based flow meter when the measured flow rate is relatively low, and generate the control signal as a function of the flow rate as measured by the pressure-based flow meter when the flow rate is relatively high so that the mass flow controller is relatively insensitive to inlet pressure perturbations.

A method of controlling the mass flow rate of a gas, comprising: measuring the flow rate of mass through the mass flow controller with a thermal-based flow meter; measuring the flow rate of mass through the mass flow controller with a pressure-based flow meter; controlling the flow rate of mass through the mass flow controller with a control valve in response to a control signal generated as a function of the flow rate as measured by one of the flow meters; wherein controlling the flow rate of mass includes generating the control signal as a function of (a) the flow rate as measured by thermal-based flow meter when the measured flow rate is relatively low, and (b) the flow rate as measured by the pressure-based flow meter when the flow rate is relatively high so that the mass flow meter is relatively insensitive to inlet pressure perturbations.

A comparison of the flow measurements of the thermal-based and the pressure-based flow meters can be used to (a) sense pressure disturbances at low flow rates so that the mass flow controller generate the control signal as a function of the flow rate measured by the pressure-based flow meter at low flow rates while the pressure disturbances are being sensed, and (b) sense when the thermal-based flow meter is out of calibration so that a zero offset signal can be applied to the thermal-based flow meter.

These, as well as other components, steps, features, objects, benefits, and advantages, will now become clear from a review of the following detailed description of illustrative embodiments and the accompanying drawings.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
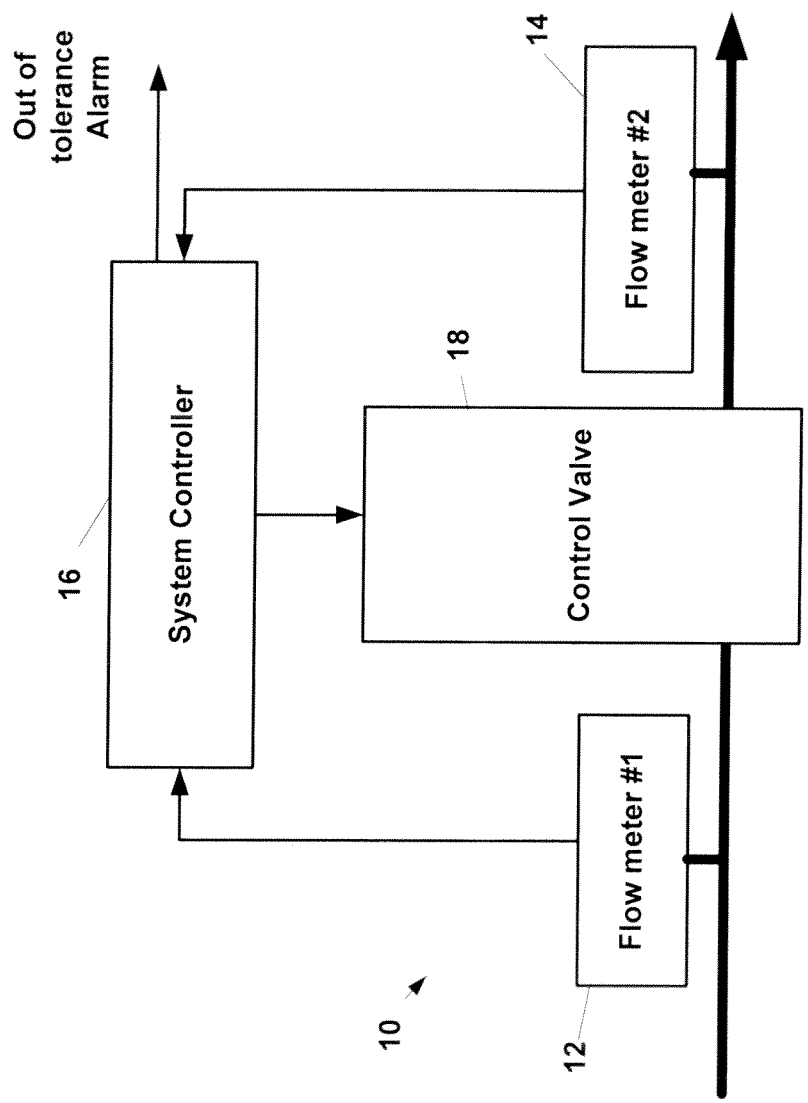
FIG. 1 is a simplified block diagram of a MFC constructed and arranged to control flow through the MFC and monitor the accuracy of the MFC in real time.

Referring to FIG. 1, the illustrated, exemplary mass flow controller 10 is constructed and arranged to control flow through the MFC and monitor the accuracy of the MFC in real time. As shown the mass flow controller 10 includes two flow meters 12 and 14, each independently generating a signal representing the measured rate of flow of gas through the MFC. The outputs of the two flow meters are provided to the system controller 16. The system controller 16 processes the two signals received from the two flow meters 12 and 14 and provides a control signal to the proportional control valve 18 based on the flow measured by one of the flow meters and a set point, and an indication ("alarm") signal when a determination is made that the difference in the flow rates as measured by the two meters exceeds a predetermined threshold.

Figure 2:
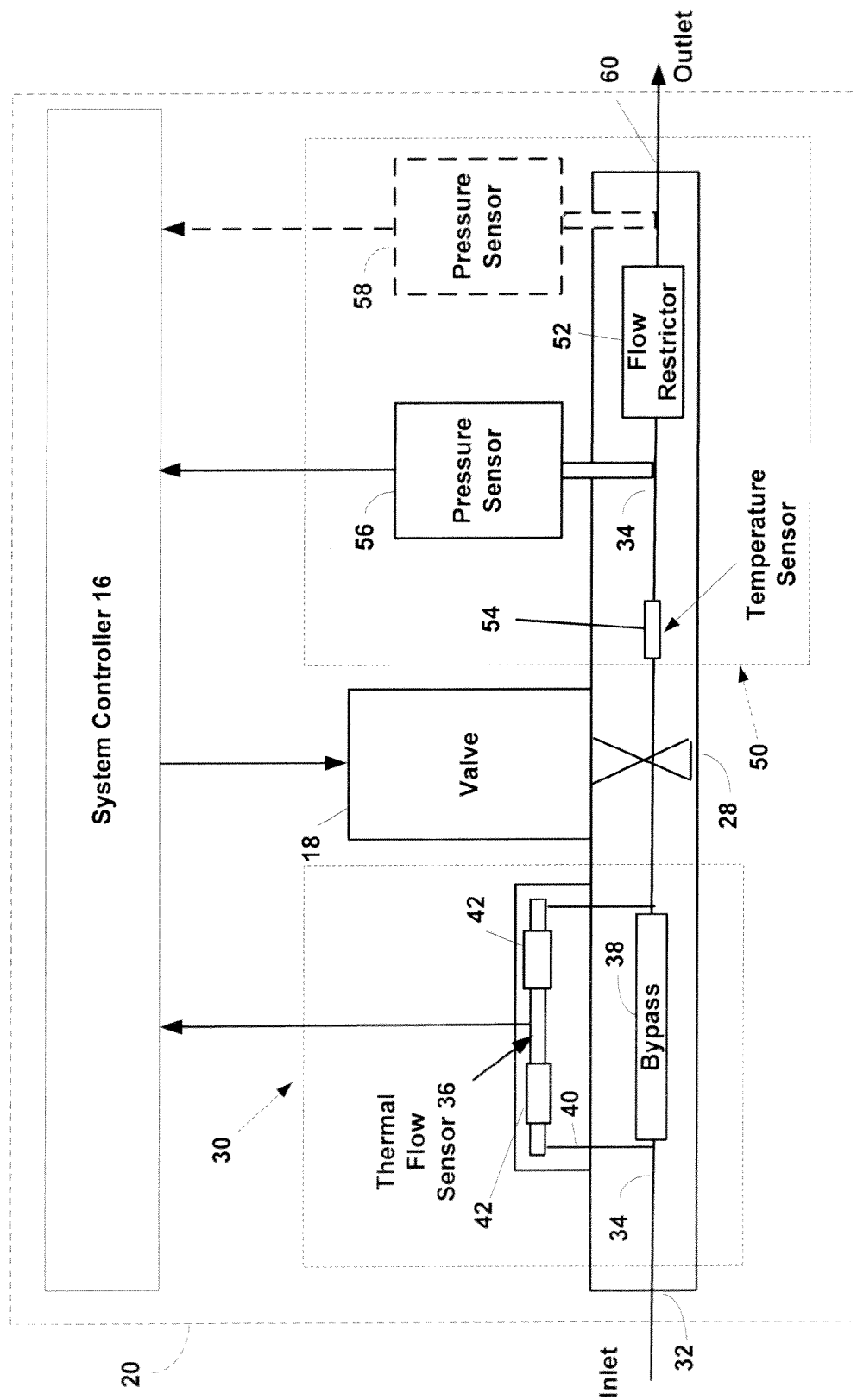
FIG. 2 is a block diagram of an embodiment of a MFC employing the teachings described herein.

A more detailed exemplary embodiment of a MFC, indicated generally at 20, is shown in FIG. 2. The MFC 20 is constructed and arranged so as to control flow through the MFC and monitor the accuracy of the MFC in real time. As shown gas is received at the input port 32 of block 28, which in turn includes a conduit defining the main flow path 34 through the MFC to the outlet port 60. The first flow meter 30 is shown as a thermal mass flow meter. Thermal mass flow meters typically include a thermal mass flow sensor 36. The latter usually includes a bypass element 38 disposed in the bypass of the main flow path 34 of the gas flow through the block 28. A U-shaped capillary tube 40 has opposite ends respectively connected to the primary pathway at the upstream and downstream ends of the bypass element 38. One or more resistance elements 42 (two being the most common) are used to measure flow through the capillary tube based on temperature measurements as a function, in the example, of the difference in resistances of the two resistance elements, which in turn is a function of the difference in the sense temperatures of the fluid, a measure of the mass flow rate. The bypass element 38 is designed to ensure that gas flow through the bypass element 38 between the two ends of the capillary tube 40 is laminar. By maintaining laminar flow, the measured flow rate of gas through the capillary tube will be an accurate percentage of the flow through the main flow path 34. Thus, the sensed flow rate through the capillary tube 40 will be an accurate measure of the flow rate though the MFC 20 and exiting outlet port 60. Data representing the sensed flow rate is communicated to the system controller 16.

The second flow meter 50 is shown as a differential pressure flow meter. For choked flow conditions, the flow meter 50 includes a flow restrictor 52 (for example, a critical flow nozzle or orifice), and a temperature sensor 54 and an upstream pressure sensor 56 arranged to measure the respective temperature and pressure of the gas flowing through the main flow path 34 upstream from the flow restrictor 52. Data representing the sensed temperature and pressure is transmitted to the system controller for use in determining mass flow through the second flow meter 50 as function of these sensed measurements. For non-choked flow conditions, a second or downstream pressure sensor 58 is provided on the downstream side of the flow restrictor 52. Data representing the sensed temperature, upstream pressure and downstream pressure is transmitted to the system controller 16 for determining the rate of mass flow through the second meter 50 as a function of the sensed measurements. The second measurement provided by the second flow meter 50 (in both the choked and non-choked embodiments) is independent of the measurement provided by the first flow meter 30.

Figure 3:
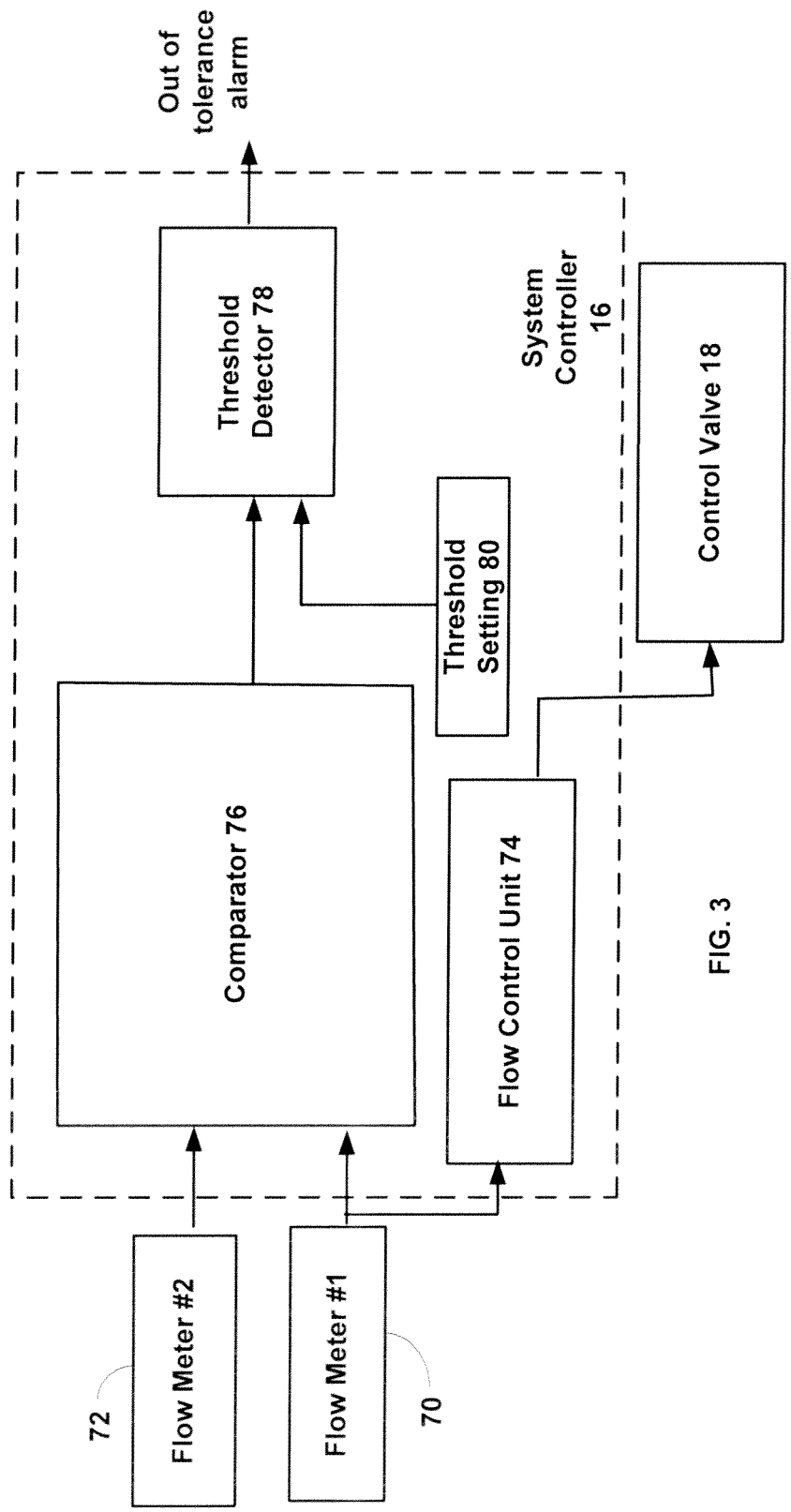
FIG. 3 is a block diagram of components for generating a signal indicating when a MFC, such as the ones described in connection with FIGS. 1 and 2 are out of calibration tolerances.

Referring to FIG. 3, the system controller 16 processes the outputs of the flow meters 70 and 72 so as to provide two flow measurements of the same flow through the MFC. As shown flow meter 70 is provided to a flow control unit 74, which in turn applies a control signal to the proportional control valve 18. A comparator 76 is provided to compare the data representing the sensed flow measurements provided by the two meters 70 and 72 to provide an output signal as a function of and representing any difference between the two measurements. This output signal is compared to some threshold value (provided by threshold setting 80) by a threshold detector 78. Should the output signal of comparator 76 exceed the threshold value (wherein the two meters provide different flow measurements such that the difference between the two exceed a predetermined threshold), the threshold detector provides an alarm or indicating signal to alert the user that at least one of the meters is inaccurate, and that the MFC should be taken off line and further tested. It should be noted that the value of the threshold setting at 80 can be provided in anyone of a number of ways including setting the value during the initial factory setup of the MFC, or user programmed. The threshold value can be set as a function of permissible tolerances in mass flow for the particular process with which the controller is used to deliver gas. Thus, some processes may permit greater tolerances in flow than others.

While the first and second flow meters have been respectively described as a thermal mass flow meter and a differential pressure flow meter in FIG. 2, they can be other types of flow meters as well, such as coriolis flow meter, magnetic flow meter or ultrasonic flow meter, depending on the application for which the MFC 20 is intended. Although it is preferred that the type of the first flow meter is different from that of the second flow meter, the two flow meters can be same type. For example, both flow meters can be either thermal mass flow meters or differential pressure flow meters. Further, although the first flow meter 30 is located upstream to the control valve 18 and the second flow meter is located downstream to the control valve 18, the locations of these two flow meters can be anywhere along the main flow path 34 of the MFC. For example, both flow meters can be upstream or downstream to the control valve 18.

As shown in FIG. 3, while the measurement from the first flow meter 70 is used in the flow control unit 74 to control the MFC flow output and the measurement from the second flow meter 72 is used to verify the accuracy of the MFC in real time, the measurement from the second flow meter 72 can be used in the flow control unit 74 to control the flow output of the MFC 20 and the measurement from the first flow meter 70 be used for flow verification.

The various embodiments of the MFC described herein can be further configured to provide pressure insensitive operation and greater accuracy of control throughout the flow range of the MFC. In general, pressure-based flow meters and thus pressure-based flow control are insensitive to pressure disturbances or perturbations at the inlet of the MFC. However, pressure-based flow meters are not very accurate at low flow rates and low inlet pressures compared to thermal mass flow meters. Accordingly, in one embodiment, shown in FIG. 4, the system controller 80 is configured and arranged similarly to controller 16 of FIG. 2, and further configured to switch between the two flow meters so as to control the position of the control valve 18 depending on the inlet pressure and flow rate through the MFC. In the FIG. 4 embodiment, the output of thermal-based flow meter 30 can be used to control the control valve 18 for relatively low flow rates, and the output of the pressure-based flow meter 50 can be used to control the control valve for relatively high flow rates. More specifically, in one embodiment the cross over point or value is determined as a predetermined percentage of the full scale rate of flow to which the flow meters are designed. The predetermined percentage number is selected as a function of the expected range of pressures of the gas flowing through the meters. Thus, when the flow rate through the MFC is determined to be less than the predetermined percentage of full scale (FS), the output of the thermal-based flow meter is used to control the control valve 18; and when the flow rate through the MFC is determined to be more than the predetermined percentage of full scale, the output of the pressure-based flow meter is used to control the control valve 18. Either flow meter can be used to control the control valve when the flow rate equals the cross-over value In one implementation, the user can determine the cross over value in percentage of full scale, and provide the value as an input at 84 to the system controller 80. Alternatively, it can be provided during manufacture of the MFC.

Thus, in one example, for flow rates less than 20% of full scale, the controller 80 will apply the output of the thermal-based flow-meter 30 to the control valve 18, and for flow rates equal to and greater than 20% full scale, the controller 80 will apply the output of the pressure-based flow meter 50 to the control valve 18. By using the thermal-based flow meter 30 to control the MFC at relatively low flow rates, the accuracy of the flow control is improved in low flow rates.

When the MFC uses pressure-based sensor measurement to control the flow through control valve, it is a pressure insensitive MFC, i.e. substantially insensitive to pressure disturbances at the inlet. However when the MFC uses thermal-based sensor measurement to control the flow, it is sensitive to inlet pressure disturbances. Accordingly, one additional feature of the disclosed MFC is to provide compensation for pressure disturbances that occur when the MFC is using thermal-based measurements to control flow. Specifically, when the mass flow control uses thermal flow sensor measurement within a low flow range and there is a pressure disturbance indicated by the sudden big flow deviation between the two flow sensors, the system controller senses the pressure disturbance, and with the controller 80 temporarily switches the flow control input from the thermal flow sensor measurement to the pressure-based flow measurement until the pressure transient period is gone. What constitutes a sudden "big flow deviation between the two flow sensors" can be determined, for example, by setting a threshold so that the deviation must exceed the threshold to be considered sufficient to warrant the change. When the deviation exceeds the threshold, the switching occurs from the thermal flow measurement to pressure-based flow measurement. When the deviation falls below the threshold, the controller 80 switches pressure-based flow measurement back to thermal flow measurement.

Figure 4:
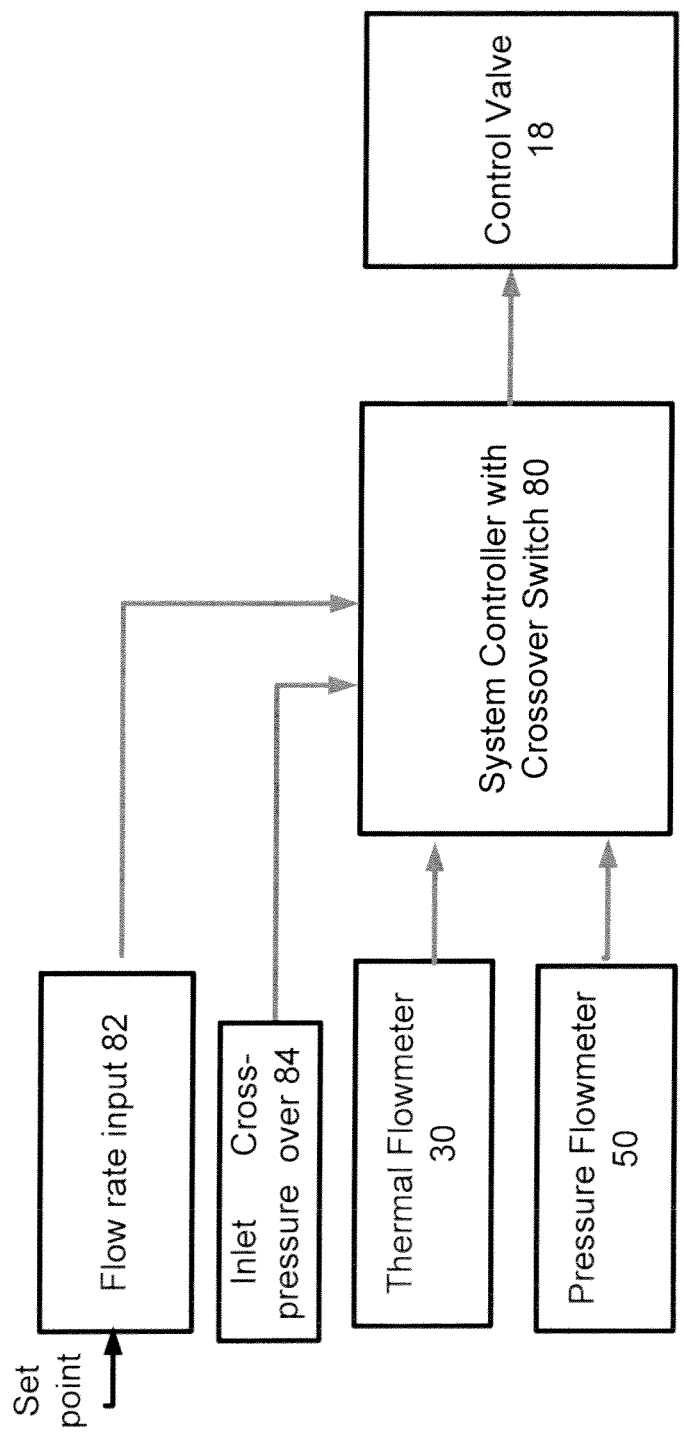
FIG. 4 is a block diagram of an embodiment of a MFC that is pressure insensitive.

In general, the output of the thermal flow meter tends to drift more than the pressure flow meter. As a result the thermal flow meter is initially calibrated by the user or at the factory to provide zero offset, i.e. the output of the thermal flow meter is calibrated with a zero offset signal so that the output of the thermal flow meter is zero with zero input. However, during use, the thermal flow meter can fall out of calibration and provide erroneous readings. Accordingly, the MFC can also be configured to sense when the thermal flow meter falls out of calibration and automatically adjust the zero offset. This can be accomplished for example by assuming that should the readings of the two flow meters differ by a predetermined permitted tolerance or amount, the thermal flow meter is assumed to be out of calibration. Accordingly the outputs of the thermal flow meter and pressure flow meter can be continually compared (even though only one flow meter controls the control value 18 at any one time during flow operations) to determine whether the thermal flow meter has fallen out of calibration. Should the output reading of the thermal flow meter vary from the output reading of the pressure flow meter by a predetermined amount, then a zero offset adjust signal can be provided by the system controller to the thermal flow meter as illustrated in FIG. 4. In general is preferable that the zero offset for the thermal flow sensor only be adjusted when the flow is above a cross-over value of the crossover switch, e.g., 20% FS since the pressure-based sensor may not provide an accurate measurement for low flow range adjustment for the flow below the 20% FS crossover, and thus a comparison of the outputs of the two flow meters may not be accurate.

It should be noted that the derivative of the two flow measurements can be used to distinguish the compared difference between the two flow measurements due to pressure disturbances, and those due to a need to calibrate the offset. In the former situation, the derivative changes rather quickly due to the rapid change in the comparative difference between the two flow measurements, while in the latter situation the derivative changes rather slowly.

The mass flow controller employing all of the features described herein has several advantages. Switching flow measurement based on the flow range for mass flow utilizes the best accuracy of both flow sensors. In addition, a pressure insensitive MFC is provided for the full flow range even without an upstream pressure sensor. Finally, self-correction can improve the accuracy of thermal flow sensor measurement which is prone to zero drift.

The components, steps, features, objects, benefits and advantages which have been discussed are merely illustrative. None of them, or the discussions relating to them, is intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

What is claimed is:

1. A mass flow controller comprising:
   a pressure-based flow meter constructed and arranged to measure the flow rate of mass through the mass flow controller;
   a thermal-based flow meter constructed and arranged to measure flow rate of mass through the mass flow controller;
   a control valve constructed and arranged so as to control the flow rate of mass through the mass flow controller in response to a control signal generated as a function of the flow rate as measured by one of the flow meters;
   an inlet for receiving a gas; and
   a system controller constructed and arranged to (a) generate the control signal as a function of the flow rate as measured by the thermal-based mass flow meter when the measured flow rate is relatively low and there are no pressure disturbances at the inlet, (b) change so as to generate the control signal as a function of the flow rate as measured by the pressure-based flow meter when the measured flow rate is relatively low and there is a pressure disturbance, and (c) generate the control signal as a function of the flow rate as measured by the pressure-based flow meter when the flow rate is relatively high, so that the mass flow controller is relatively insensitive to inlet pressure perturbations.

2. The mass flow controller according to claim 1, wherein the system controller is configured with a cross-over value, wherein the system controller generates the control signal as a function of the flow rate measured by the thermal-based flow meter when the measured flow rate is below the cross-over value, and generates the control signal as a function of the flow rate measured by the pressure-based flow meter when the measured flow rate is greater than the cross-over valve.

3. The mass flow controller according to claim 2, wherein the cross-over value is selected as a function of the range of flow to which the mass flow controller controls.

4. The mass flow controller according to claim 2, wherein the cross-over value is manually entered.

5. The mass flow controller according to claim 2, wherein the cross-over value is factory installed.

6. The mass flow controller according to claim 2, wherein the mass flow controller includes an inlet for receiving a gas; and the system controller is also constructed and arranged to generate the control signal as a function of the flow rate as measured by the thermal-based mass flow meter when the measured flow rate is relatively low and there are no pressure disturbances at the inlet, and change so as to generate the control signal as a function of the flow rate as measured by the pressure-based flow meter when the measured flow rate is relatively low and there is a pressure disturbance.

7. The mass flow controller according to claim 6, wherein the pressure disturbance is indicated by a sudden big flow deviation between the thermal-based flow meter and the pressure-based flow meter.

8. The mass flow controller according to claim 2, the outputs of the thermal-based flow meter and pressure-based flow meter are compared to determine whether the thermal flow meter has fallen out of calibration.

9. The mass flow controller according to claim 8, wherein a zero offset adjust signal is provided to the thermal flow meter when the output reading of the thermal flow meter varies from the output reading of the pressure flow meter by a predetermined amount.

10. A method of controlling the mass flow rate of a gas with a mass flow controller, comprising;
    measuring the flow rate of mass through the mass flow controller with a thermal-based flow meter;
    measuring the flow rate of mass through the mass flow controller with a pressure-based flow meter;
    controlling the flow rate of mass through the mass flow controller with a control valve in response to a control signal generated as a function of the flow rate as measured by one of the flow meters; and
    wherein controlling the flow rate of mass includes generating the control signal as a function of (a) the flow rate as measured by the thermal-based mass flow meter when the measured flow rate is relatively low and there are no pressure disturbances at the inlet, (b) the flow rate as measured by the pressure-based flow meter when the measured flow rate is relatively low and there is a pressure disturbance, and (c) the flow rate as measured by the pressure-based flow meter when the flow rate is relatively high so that the mass flow meter is relatively insensitive to inlet pressure perturbations.

11. The method according to claim 10, wherein controlling the flow rate of mass includes generating the control signal as a function of (a) the flow rate as measured by the thermal-based mass flow meter when the measured flow rate is below a cross over value, and (b) the flow rate as measured by the pressure-based flow meter when the flow rate is above the cross-over value, so that the control of the flow rate is relatively insensitive to pressure perturbations.

12. The method according to claim 11, wherein the cross-over value is selected as a function of the range of flow to be controlled.

13. The method according to claim 11, wherein the cross-over value is manually entered.

14. The method according to claim 11, wherein the cross-over value is factory installed.

15. The method according to claim 11, wherein controlling the flow rate of mass includes generating the control signal as a function of (a) the flow rate as measured by the thermal-based mass flow meter when the measured flow rate is relatively low and there are no pressure disturbances at the inlet of the mass flow controller, (b) the flow rate as measured by the pressure-based flow meter when the flow rate is relatively low and there are pressure disturbances at the inlet so that the mass flow meter is relatively insensitive to inlet pressure perturbations.

16. The method according to claim 15, wherein a pressure disturbance is indicated by a sudden big flow measurement deviation between the thermal-based flow meter and the pressure-based flow meter.

17. The method according to claim 16, wherein the sudden big flow deviation occurs when the deviation exceeds a threshold.

18. The method according to claim 10, further including comparing the outputs of the thermal flow meter and pressure flow meter to determine whether the thermal flow meter has fallen out of calibration.

19. The method according to claim 18, further including providing a zero offset adjust signal to the thermal flow meter when the output reading of the thermal flow meter varies from the output reading of the pressure flow meter by a predetermined amount.

\* \* \* \* \*